United States Patent
Rahmati et al.

(10) Patent No.: US 10,667,157 B2
(45) Date of Patent: May 26, 2020

(54) INDIVIDUALIZED ADAPTIVE WIRELESS PARAMETER TUNING FOR STREAMING CONTENT

(71) Applicant: Apple Inc., Cupertino, CA (US)

(72) Inventors: Ahmad Rahmati, Mountain View, CA (US); Natalia A. Fornshell, Campbell, CA (US); Aarti Kumar, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 16/107,934

(22) Filed: Aug. 21, 2018

(65) Prior Publication Data

US 2019/0373490 A1 Dec. 5, 2019

Related U.S. Application Data

(60) Provisional application No. 62/679,709, filed on Jun. 1, 2018.

(51) Int. Cl.
*H04W 24/08* (2009.01)
*H04L 12/26* (2006.01)
*H04L 29/06* (2006.01)

(52) U.S. Cl.
CPC .......... *H04W 24/08* (2013.01); *H04L 43/062* (2013.01); *H04L 43/087* (2013.01); *H04L 43/0829* (2013.01); *H04L 65/602* (2013.01); *H04L 65/80* (2013.01)

(58) Field of Classification Search
CPC ..... H04L 43/087; H04L 65/80; H04L 43/062; H04L 65/602; H04L 43/0829
See application file for complete search history.

(56) References Cited

U.S. PATENT DOCUMENTS

| | | | |
|---|---|---|---|
| 9,326,060 B2 * | 4/2016 | Nicholson | H04N 5/772 |
| 2014/0286497 A1 * | 9/2014 | Thyssen | H04R 3/005 |
| | | | 381/66 |
| 2015/0245133 A1 * | 8/2015 | Kim | H04R 1/326 |
| | | | 381/92 |

* cited by examiner

*Primary Examiner* — Mewale A Ambaye
(74) *Attorney, Agent, or Firm* — Kilpatrick Townsend & Stockton; David Raczkowski

(57) ABSTRACT

A source device can transmit initial streaming content to a playback device (e.g., wireless ear buds) using first settings and measure playback performance of the content at a plurality of times. The measured performance values can relate to a quality of communication of the initial streaming content between the source device and the playback device, e.g., relating to packet loss, retransmission rates and patterns, fluctuations in a playback (jitter) buffer, and/or other values. The measured performance values can be used to determine one or more second settings to be used for a playback of subsequent streaming content between the source device and the playback device. In this manner, each source device can account for variations in communication behavior specific to a user (e.g., due to differences in body type as electromagnetic waves travel through the body when a source device is in a pocket).

20 Claims, 9 Drawing Sheets

INDIVIDUALIZED ADAPTIVE WIRELESS PARAMETER TUNING FOR STREAMING CONTENT

CROSS-REFERENCES TO RELATED APPLICATIONS

This application claims the benefit of U.S. Provisional Application No. 62/679,709, filed Jun. 3, 2018, entitled "Customized Per-User Device Environment Parameter Tuning For Streaming Content Playback." The disclosure of this application is incorporated by reference herein in its entirety.

BACKGROUND

Mobile devices and other source device can be used to stream various media (e.g., music and movies) to playback devices, e.g., headsets and televisions. Such streaming is typically performed using wireless protocols (e.g., Bluetooth or WiFi). But, such streaming may not be flawless, and thus a user may hear skipping or pauses (e.g., glitches) in the audio. Or, a user may see pixilation, blocking, or dropped frames in the images.

Certain conservative settings for the wireless connection or for processing by the devices can be set to provide greater reliability. But, a conservative setting for reliability can come at the cost of increased latency. Other tradeoffs can also exist, e.g., using more power can provide higher quality streaming, but at a cost of reduced battery life.

BRIEF SUMMARY

To address one or more of the above problems, a source device can transmit initial streaming content to a playback device (e.g., wireless ear buds) using first settings and measure playback performance of the content at a plurality of times. The measured performance values can relate to a quality of communication of the initial streaming content between the source device and the playback device, e.g., relating to packet loss, retransmission rates, fluctuations in a playback buffer (jitter buffer) level, and others disclosed herein. The measured performance values can be used to determine second settings to be used for a playback of subsequent streaming content between the source device and the playback device. In this manner, each source device can account for variations in communication behavior specific to a user (e.g., due to differences in body type as electromagnetic waves travel through the body when a source device is in a pocket). The second settings can deliver improved performance, or even be optimal, relative to the previous measurements, which may be performed with various settings.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
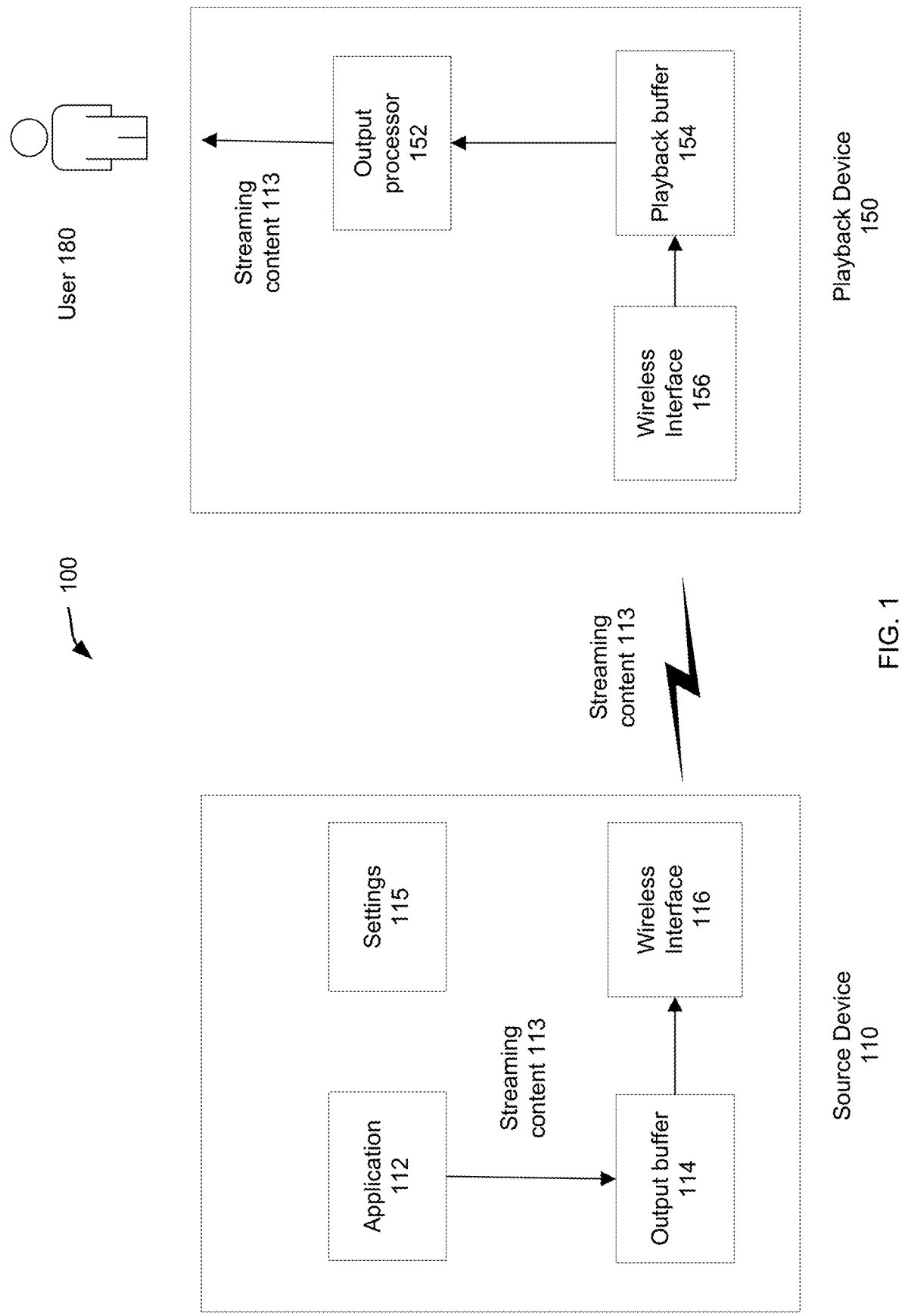
FIG. 1 shows an example playback system between a source device and a playback device that may be improved by embodiments of the present disclosure.

More advantageous and/or optimal settings for streaming content from a source device (e.g., a smart phone) to a playback device (e.g., a headset) can vary from user to user. For example, a user may have a smart phone in a pocket, and thus the electromagnetic (EM) waves can travel through the body to a wireless headset. Different bodies can have different EM characteristics, resulting in different qualities of playback with a same setting. Other reasons for variation can include typical placement of the source device (e.g., on a table or in tight clothing) or physical fit of speaker buds within an ear, e.g., when the ear buds have an antenna in them.

It is possible to use fixed settings that provide reliability for worst possible conditions of all users. But, such conservative settings have a tradeoff for the performance of other parameters of a playback session. For instance, greater reliability can be achieved by increasing a jitter buffer on the playback device, but the greater reliability would come at a price of increased latency. As another example, certain audio codecs can reduce glitches, but negatively impact fidelity. Such communication issues can arise with local wireless communications, e.g., using Bluetooth or WiFi.

To provide better settings for a given source device (potentially in combination with a particular playback device), a source device can track performance for different variable playback settings (e.g., wireless settings) and different application or device states (e.g., geographical location or whether the source device is in a pocket). Such system properties that are not varied can collectively refer to a system configuration. Performance can be measured for different settings of a same configuration.

The source device can analyze performance statistics to determine improved or "optimal" values for one or more settings related to the communication of the streaming content, for a given configuration. Such improved/optimal value(s) can be specific to the particular source device, user, and playback device. For example, an improved/optimal setting for a jitter buffer of a particular playback device of one user can be 140 ms, while a source and playback device of a different user can determine an improved/optimal value of 150 ms for a jitter buffer. These different values can result from the customized analysis of the two respective source devices of the different users. In this manner, one user is not penalized with increased latency as a result of a conservative setting that is based on a worst-case scenario.

Such a selection of a particular setting for a given source device (potentially in combination with a particular playback device) can be selected prior to establishing a next connection. But, setting(s) can also be changed after a connection is established between the source device and the playback device, e.g., during a streaming session. Thus, a given setting can be dynamically chosen based on current system properties and current performance measurements, which can be monitored during the lifetime of a connection. The determination of how to modify the settings for a given configuration can be determined based on the historical performance measurements, which can provide a functional relationship (mapping) between system properties (settings and non-settable properties, such as device states) and performance values, thereby allowing improved/optimal settings to be determined. In this manner, improved/optimal settings can be determined for different configurations, and settings can be updated based on changing conditions from one configuration to another configuration, e.g., a different location of the source device or changes in noise/interference both examples of non-settable properties that may comprise a configuration. Thus, certain measured properties (e.g., of link states) can be part of a configuration, while other measured performance values can be changed by updating the settings.

The determination of the "optimal setting" can be based on the performance statistics for the same or similar historical configurations (conditions) as compared to the current configuration. The term "optimal setting" refers to a setting being more desirable than and/or offering an improvement over another setting, and does not mean that the particular setting is better than every other possible setting. Settings may be updated as a result of performance being outside of a specified range (e.g., pack loss falls outside of an acceptable range), thereby allowing measurements over various settings and enabling optimal settings to be determined. Alternatively, to determine an optimal setting, some embodiments can purposefully modify settings under various conditions to explore the space of possible settings so as to determine optimal settings.

Various types of streaming content may be used, e.g., audio, video, haptics, and the like. Various embodiments can be used with congested or unreliable wired or wireless interfaces (links). In some embodiments, the wireless interface can be Bluetooth Advanced Audio Distribution Profile (A2DP).

I. Example Playback System

FIG. 1 shows an example playback system 100 between a source device and a playback device that may be improved by embodiments of the present disclosure. A source device 110 can provide streaming content to playback device 150, which can then play the streaming content. Examples herein refer to playback of audio, but such examples are equally applicable to other types of streaming content. In some embodiments, source device 110 may be a portable device, e.g., a mobile phone. Playback device 150 may be any suitable device capable of outputting the type of content, e.g., wireless headphones.

Source device 110 can provide streaming content 113 to playback device 150 according to settings 115. Application 112 can provide streaming content 113, e.g., streaming music. Application 112 can be selected by a user, e.g., using a user interface of source device 110, and may retrieve the content from external sources, e.g., a video/audio server. Application 112 can be configured to provide streaming content 113 at a rate corresponding to a playback time. For example, application 112 can provide one second of audio content for every second of audio that is played by playback device 150.

Source device 110 can include an output buffer 114, which may be a relatively small buffer for feeding data to a network interface, e.g., wireless interface 116. Wireless interface 116 can then transmit the streaming content to wireless interface 156 of playback device 150. This transmission may not be perfectly uniform (e.g., due to interference) and so data packets may not be received in the proper order or always at the same rate. For example, source device 110 may be in a user's back pocket, thereby causing a link state with poor communication. Example wireless interfaces include Bluetooth and WiFi.

To address such difficulties in the wireless communication between source device 110 and playback device 150, settings 115 can be changed. One example of settings 115 is a size of a playback buffer 154 that provides streaming content to output processor 152 for playing to a user 180. For instance, playback buffer 154 may store 100 milliseconds of data. Thus, if there is RF interference within the environment resulting in no packets being received for 100 milliseconds, playback buffer 154 can still provide the audio to output processor 152 so it can play audio without the user noticing. RF interference is an example of a non-settable system property, specifically of a link state between source device 110 and playback device 150. Typically, jitter buffers are measured in time, but they can also be measured in amount of memory, both of which are examples of sizes of a buffer. Such sizes are the amount of data that is to be stored before sending the data to output processor 152, thereby resulting in latency, but providing reliability.

While encountering transmission problems during streaming the content from source device 110 to playback device 150, the data level in output buffer 114 can momentarily increase due to slow transmission or need for retransmission. In such a case, the data level in playback buffer 134 will momentarily decrease. But, once the communication issue goes away, the two buffers can equilibrate. Such transient changes of transmission data rates can be due to RF conditions and coexistence of Wi-Fi. These fluctuations in transmission rates is separate from the rate at which application 112 provide streaming content 113, which relates to a sustained transmission rate from source device 110 to playback device 150 over a period of time.

Accordingly, a jitter buffer can temporarily store arriving packets in order to minimize delay variations. If packets arrive too late, then they may be discarded. A jitter buffer may be this configured and be either too large or too small. If a jitter buffer is too small, then an excessive number of packets may be discarded, which can lead to degradation in the playback experience. If a jitter buffer is too large, then the additional delay can lead to excessive latency. Such a tradeoff is just one example of various tradeoffs in performance for various settings. Example sizes for a jitter buffer are between 30-300 ms.

Playback buffer 154 can be located in various places of playback device 150. For example, all or a portion of playback buffer 154 can occur in a program stack of a network circuit corresponding to wireless interface 156. As another example, all or a portion of playback buffer 154 can be in another processor (not shown or in output processor 152). The other processor could be an always-on processor of playback device 150 that processes user input.

The playback quality and performance of source device 110 can be affected by other settings besides a jitter buffer size. For example, settings 115 can specify a particular codec for particular type of data (e.g., an audio codec), a power level for the transmission antenna used in wireless interface 116, and specific packetization of the data sent over the wireless channel. However, instead of such settings being static (e.g., set by a manufacturer or provider of the operating system or other components), embodiments can have dynamic settings that are determined by the source device itself.

II. User Variation in Performance

Through user studies, statistics, and experience, it has been learned that there is a large user-to-user variation in many devices, including in Bluetooth headphone wireless performance (e.g., link margin, fading, body-block), ultimately causing packet loss, high retransmission rates, and audio glitches. The user-to-user variation has been observed both in self-reported data (e.g., audio glitches) and measurement data (e.g. received signal strength indicator (RSSI), packet loss, and retransmission rates).

Example reasons for the variation among users are as follows:
- Body type, size, and composition causing body block (e.g., different water content);
- Earphone fit affecting (e.g. detuning) antenna performance (e.g., antenna pushed against face in some users);
- Pocket location and tightness affecting both body block and antenna performance.

Such variations between different users can also depend on different locations in which the source device is typically used, and even conditions such as how tight a pocket is can affect how the link between the two devices will perform.

An approach to accommodate the diverse user population is to tune the various Bluetooth parameters and tradeoffs to the worst case users. This ensures acceptable performance for all users, but may come at the cost of lower performance/quality for a large proportion of users. For instance, the devices of 90 out of 100 users may perform well at one setting, but the other 10 users may not perform well at that setting. With such an approach, the 90 users are forced to use an inferior setting, at least inferior for them, to achieve acceptable performance for the remaining 10 users. Thus, there is a compromise.

Instead, embodiments can have a source device individually monitor performance of playback of streaming content over time. This particular source device can select settings based on the particular performance statistics measured by this particular source device. For instance, the source device can detect when playback is not performing within a specified tolerance, and make adjustments to the settings. The source device can determine which settings perform better than others (i.e., optimal settings) for a given system configuration. For example, the source device can use the optimal settings for a next streaming session. In addition or alternatively, the source device can also use the historical performance statistics to determine how to update a setting during a streaming session.

A. Relative Locations Ref Source Device and Playback Device

Given that a particular source device can track performance statistics, each source device can determine particular settings that are specific to the corresponding user of that source device. These different settings can result from particular properties of the user himself, e.g., as a result of body composition or as a result of a typical manner of usage.

Figure 2B:
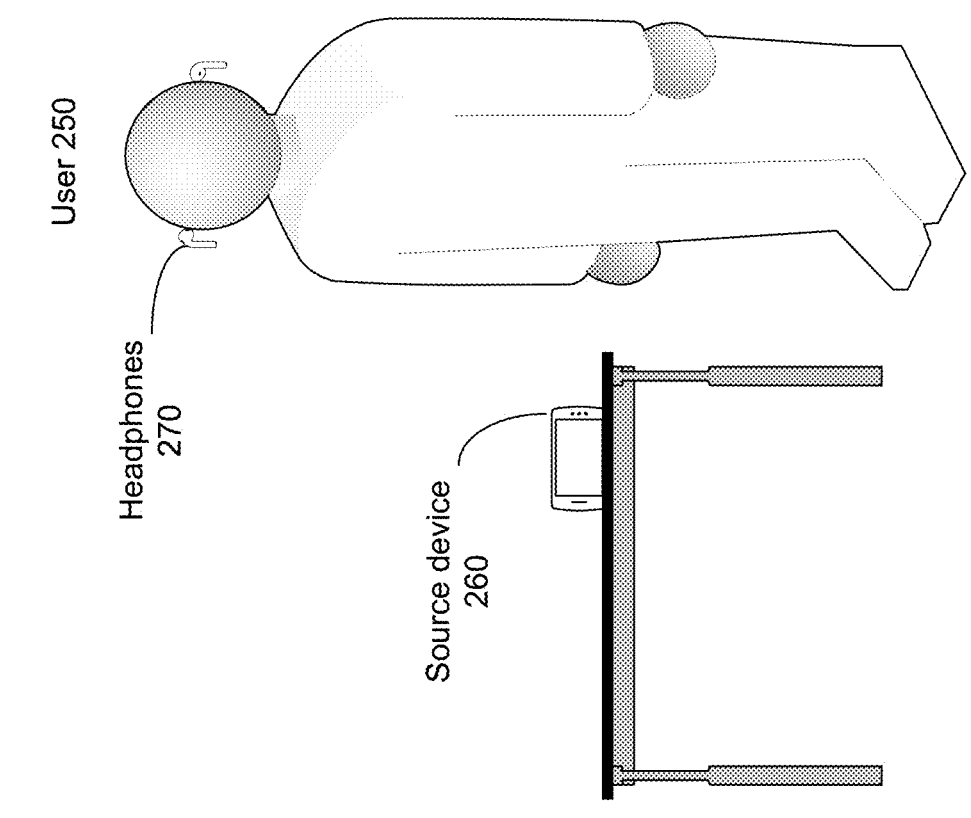
FIGS. 2A and 2B shows different relative locations of a source device to headphones for which performance can be improved according to embodiments of the present disclosure.
Figure 2A:
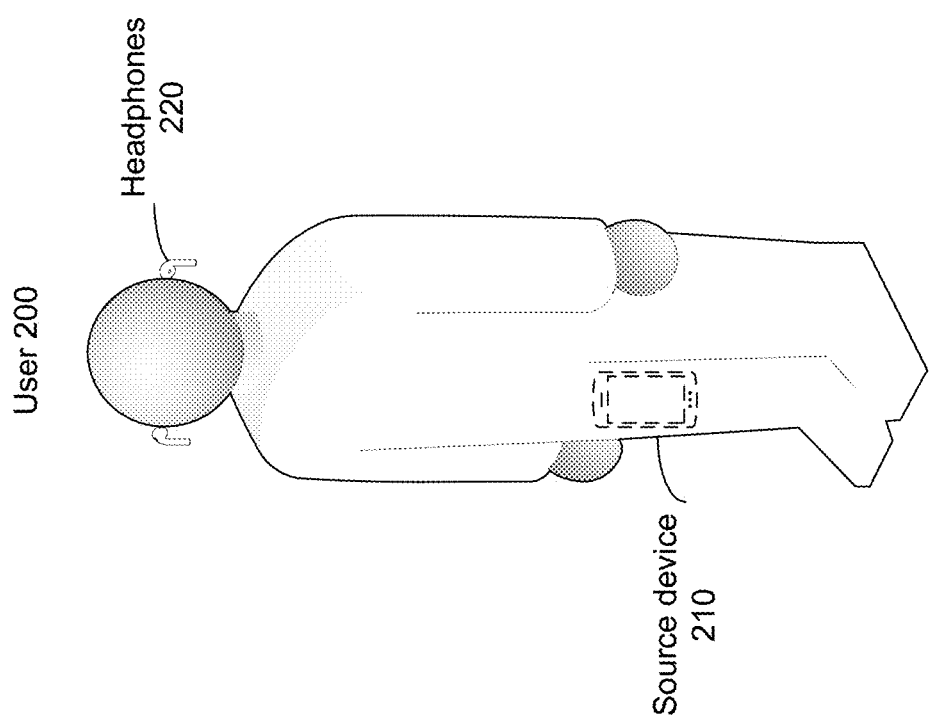

FIGS. 2A and 2B shows different relative locations of a source device to headphones for which performance can be improved according to embodiments of the present disclosure. FIG. 2A shows a relative location that can provide different performance statistics based on the body composition for different users. The different sources devices of the different users can determine different optimal settings as a result of the different performance statistics. FIG. 2B illustrates a relative location that might be used most often by a user and that can result in different optimal settings than if the location in FIG. 2A was used more often by the user.

In FIG. 2A, a source device 210 is in a pocket of a user 200. Thus, the electromagnetic (EM) signals from source device 210 to headphones 220 may pass through the body of user 200. Further, an antenna of source device 210 may press against clothing (e.g., if the pocket is tight), thereby causing interference. Given this location of source device 210, the different body compositions of different users can result in different optimal settings.

Source device 210 can respond to the different body compositions by tracking which settings work better than others, thereby determining optimal settings for future streaming sessions. The tuning of the settings can occur periodically, e.g., using a combination of recent measurements and historical measurements. The performance statistics can be tracked for different system states, e.g., optimal settings can be determined for when source device 210 is in different location. For example, source device 210 can detect when it resides in a pocket, as may be done with a light sensor and/or angular orientation (e.g., vertical along with a screen off state Then, source device 210 can determine when it is in the such a location (e.g., in a pocket), and then use optimal settings tuned for such a system configuration for the particular user.

As another example, source device 210 can track performance statistics generally for any system configuration (e.g., non-settable source device states, link states, and playback device states) to determine default optimal settings for a user. User 200 may often use source device 210 in such a manner, i.e., streaming content from a pocket. Thus, user 200 may benefit from default settings that are optimized for addressing such transmission difficulties that occur in a most common system configuration. For example, a jitter buffer can be relatively large to increase reliability.

In FIG. 2B, a source device 260 is on a table. In this manner, the EM signals from source device 260 to headphones 270 of user 250 do not travel through the user's body. Such conditions can result in less interference than in FIG. 2A. User 250 may often use source device 260 in such a manner. Thus, user 250 may benefit from settings that are optimized for situations where fewer transmission difficulties are encountered. For example, a jitter buffer can be relatively small to reduce latency.

B. Properties of Source Device and Playback Device

Besides a relative location between a source device and a playback device, variation can occur between geographical locations. Some geographical locations can have higher interference than others as a result of the environment around that location), and thus have different optimal settings. In some implementations, a source device can track which settings are optimal at each of a plurality of locations (each corresponding to a different system configuration). Then, when the source device determines that it is at one of the locations, the source device can select the optimal setting corresponding to that location. In addition or alternatively, the source device can determine a default setting to be used across locations, e.g., based on where streaming content (or a particular type of content) is most often played.

Figures 3A, 3B:
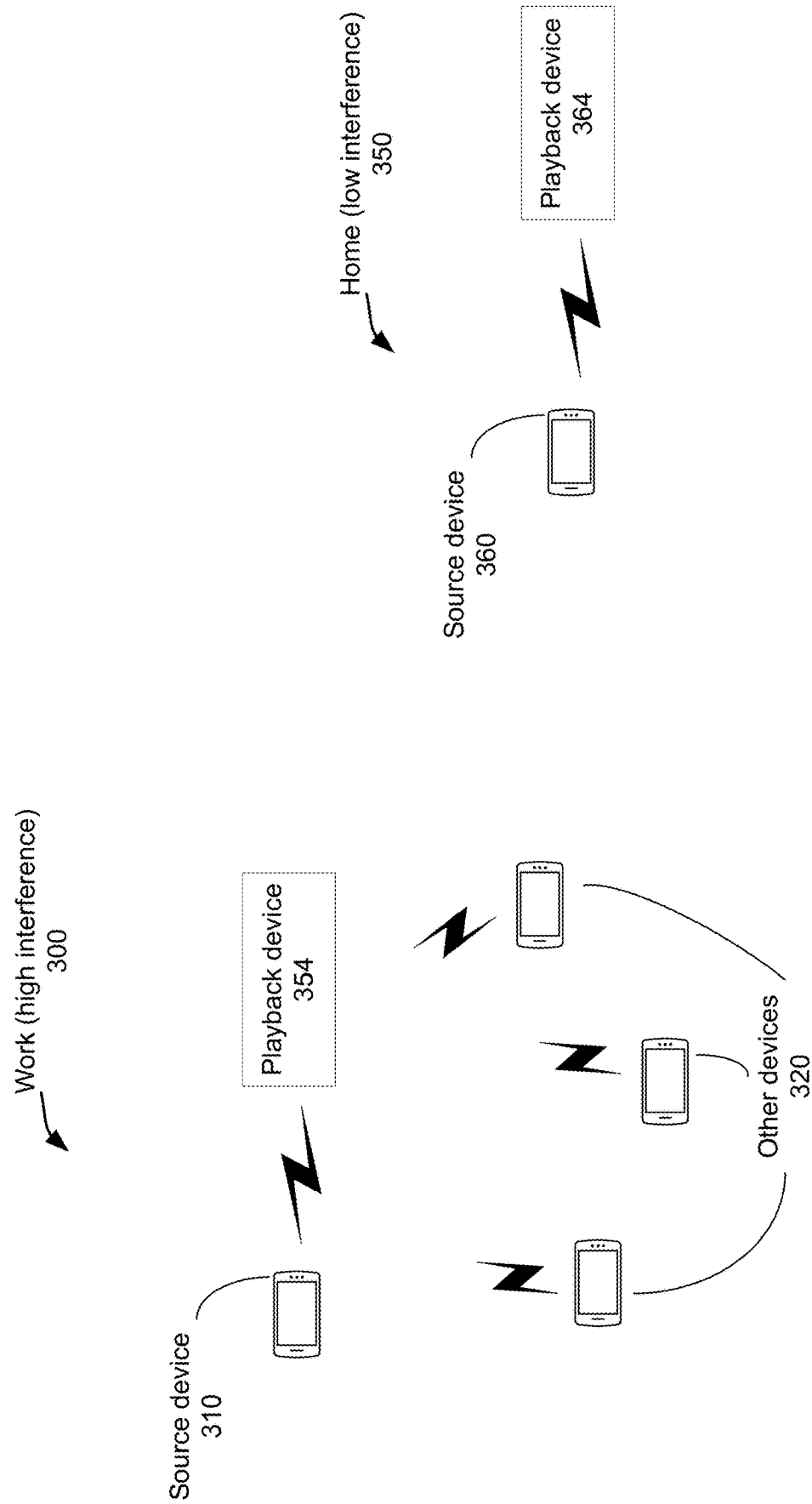
FIGS. 3A and 3B show different geographical locations that have environments with different levels of interference for playing content on a playback device from a source device, where performance can be improved according to embodiments of the present disclosure.

FIGS. 3A and 3B show different geographical locations that have environments with different levels of interference for playing content on a playback device from a source device, where performance can be improved according to embodiments of the present disclosure. FIG. 3A shows a work environment 300 that has high interference for source device 310 playing content on a playback device 354. As depicted, the high interference results from other devices 320, which are also providing EM signals, e.g., to their own playback devices or for other purposes. Such an environment might occur in a high density environment, as may occur in cubicles at an office. Different source devices can determine different optimal settings for their own unique work environment.

FIG. 3B shows a home environment with a relatively low interference for source device 360. At a home, there would typically be fewer devices to provide interference, unless the user lived in a community with high density, e.g., in apartments. Source device 360 can determine settings that are particular to its home environment 350. A different source device can determine settings that are unique to its particular environment.

III. Personalized Settings Based on Personal Statistics

Embodiments can one or more tune settings (parameters) of a communications link between a source device and a playback device for streaming content. For example, one or more Bluetooth settings can be tuned to individual users, as well as tune a tradeoff in performance between different values for a setting. A source device can gather performance statistics and tune the settings per device, per user, per environment, per source device placement (e.g., pocket, table, or angle/orientation), or any combination of these. In this manner, a particular optimal setting can be selected for a particular configuration (e.g., application, device, and link states). Environment and source device placement are examples of device states. A type of streaming content or a type of application are examples of application states. A type of communications interface (e.g., wireless protocol) or noise/interference properties of the link (connection) are examples of link states.

To enable such customization, a source device can collect statistics over time, individualized for the user for that device. In some embodiments, the source device can store optimal settings for different configurations, so as to provide personalized settings for different states. Sensors such as GPS, inertial sensors (e.g., accelerometer or gyrometer), light sensors, and the like can be used to determine a current device state.

A. Source Device for Personalization

Figure 4:
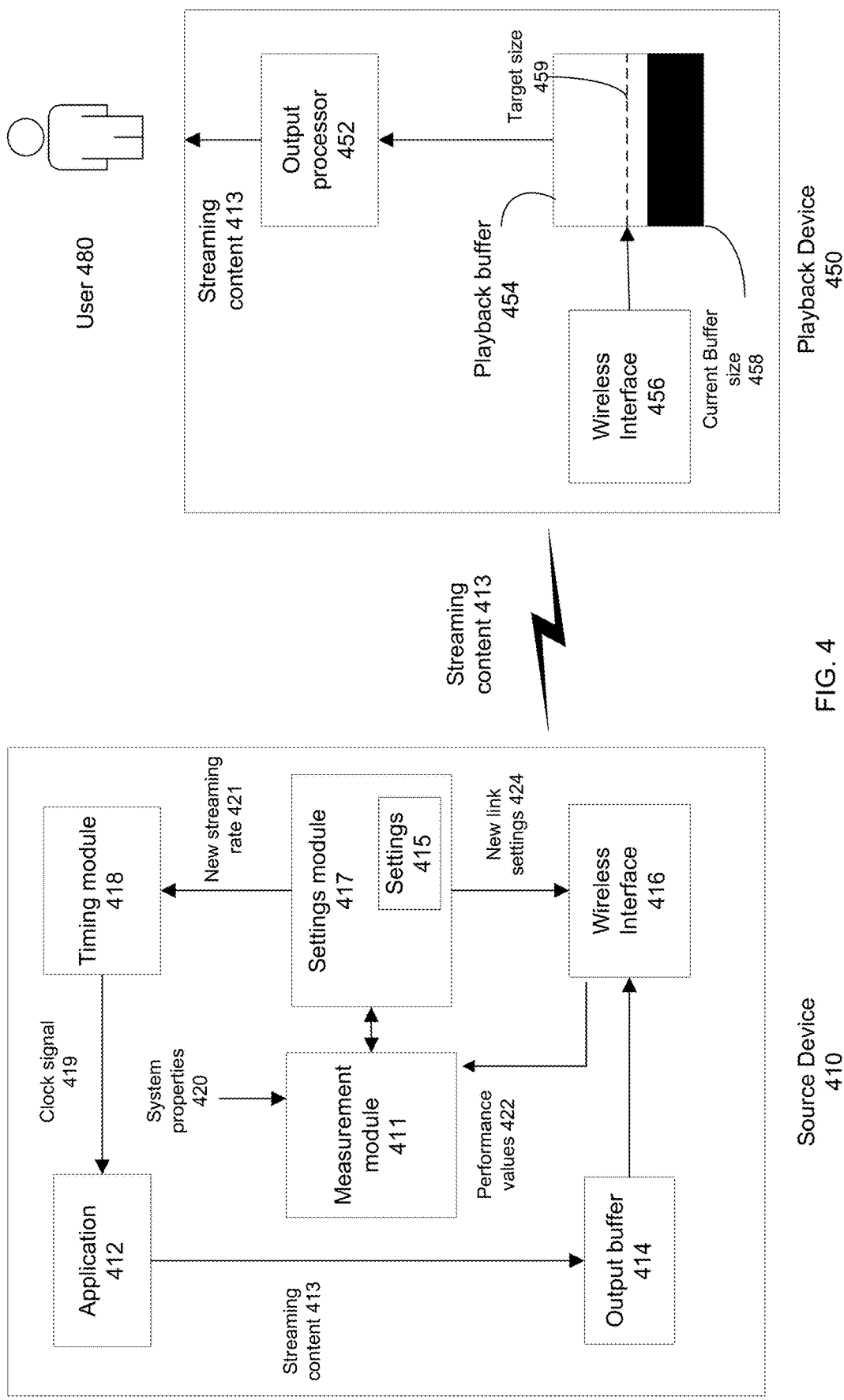
FIG. 4 shows an example playback system between a source device and a playback device according to embodiments of the present disclosure.

FIG. 4 shows an example playback system between a source device and a playback device according to embodiments of the present disclosure. A source device 410 can identify the properties of a current system configuration while content is transmitted to playback device 450, and then use these performance statistics to determine optimal settings for the different system configurations. Such settings can include providing commands to playback device 450 to update a buffer size and providing an updated streaming rate to an application 412, such that content is streamed at a lower/higher rate for a certain amount of time to effectuate the change in buffer size. Aspects of FIG. 4 may be implemented in a similar manner as in FIG. 1. In various embodiments, the communication between source device 410 and playback device 450 may occur via a direct wireless connection (e.g., Bluetooth) or via a wireless local area network (WLAN), e.g., via a WiFi router.

An application 412 can provide streaming content 413 to an output buffer 414, which in turn provides streaming content 413 to a wireless interface 416. Similar to FIG. 1, a wireless interface 456 can provide the received content to a playback buffer 454. Once the data level in playback buffer 454 reaches the specified size, data packets can be provided to an output processor 452 for playing to a user 480.

In some embodiments, at an initial step, source device 410 can determine which settings are configurable for a given configuration, e.g., which settings may be updated for source device 410 and playback device 450. For example, source device 410 can determine whether playback device 450 supports a configurable buffer size, a host-settable buffer size. As shown, playback buffer 454 has a current buffer size 458 shaded in a dark region. A target size 459 for playback buffer 454 is shown with a dotted line. Thus, in this snapshot in time, the size of playback buffer 454 is increasing. At least a portion of playback buffer 454 is variable to allow for the change in size, e.g., a fixed portion of the buffer can be implemented in hardware and a variable portion can be implemented in software.

Settings module 417 can include settings 415 that may be used to establish and implement a playback session, including settings for source device 410 (e.g., settings for application 412), settings related to the communications link to playback device 450, and settings of playback device 450 (e.g., size of a playback buffer). Settings 415 can be modified between playback sessions or during a playback session. For example, an initial setting (e.g., a conservative setting) may be provided as a default by a manufacturer of source device 410, playback device 450, any components of the devices, or any software on the devices. A setting can then be updated based on one or more performance statistics and used for a future playback session or subsequent portion of a current playback session. For example, new link settings 424 can be provided to wireless interface 416 for use.

Measurement module 411 can receive various measurements about a playback session, e.g., system properties 420 and performance values 422 of the session. System properties 420 can be obtained from any component of the system (e.g., a battery, application 412, wireless interface 416, etc.), thereby providing a current system configuration along with the settings, e.g., for source device 410, wireless interface 416, and playback device 450. The system properties can include states of the devices, e.g., a location of source device 410, whether a user is interacting with the device, or what resources are being used.

Wireless interface 416 can provide performance values 422 to measurement module 411. As examples, performance values 422 can include buffer depth being used, retransmission rate, packet loss, and others mentioned herein. Measurement module 411 can aggregate performance values 422 and store them with the corresponding system configuration and settings that existed when the performance values were measured. Accordingly, measurement module 411 can gather performance statistics for different values of a current setting, e.g., statistics on jitter buffer usage over time.

Settings module 417 can determine one or more new settings for performing the playback of streaming content 413 using the performance statistics from measurement module 411. As an example, settings module 417 can tune (and likely reduce) the buffer size to maintain a predetermined (low) glitch rate, while optimizing the tradeoff between latency and audio glitch rate for that particular source device, given its usage patterns and environments. For example, settings module 417 can determine target size 459 as a new setting. Settings module 417 can determine that a new buffer size is desirable based on system properties 420 (e.g., state of the source device, link properties, and state of the playback device). Measurement module 411 and settings module 417 can be located in various places within source device 410, e.g., on a wireless chip or in an application processor of source device 410, Settings module 417 can have logic for determining settings, e.g., a target size 459 of playback buffer 454. The logic can take into account tradeoffs in resulting performance values for different values of a setting, e.g., the tradeoff between latency and reliability. The logic can be implemented in various ways, e.g., via deterministic code that specify the setting for specific values of system properties 420, which may be specified in a table or a decision tree to provide discrete changes in values of the settings. In other examples, a continuous function can provide a continuous change in buffer size, e.g., relative to continuous changes in one or more system properties. Such a continuous function can be determined by training a machine learning model.

A frequency of updates to the target size can be limited, e.g., to when one or more of the system properties change significantly (e.g., so updates are not always occurring). A significant change may be determined based on a comparison to a threshold. An example threshold can be one skip every hour.

In an example where a new setting is a buffer size, settings module 417 can inform timing module 418 of the change, e.g., by providing a new streaming rate 421 to timing module 418. Timing module 418 can provide a clock signal 419 to application 412 to cause a change in a rate that application 412 provides streaming content 413. For example, if the size of playback buffer 454 is to increase, clock signal 419 can be increased from a normal rate. And, if the size of playback buffer 454 is to decrease, clock signal 419 can be decreased from a normal rate. In this manner, application 412 can operate in a normal manner, unaware of its change in operation. In other embodiments, application 412 can be programmed to include internal functionality that enables it to change the speed of providing streaming content.

Accordingly, some embodiments can induce an application to speed up or slow down its production rate of streaming content. In other embodiments, the source device can provide explicit commands to the application to change the streaming rate. Thus, in order to reduce (increase) the jitter buffer size, instead of speeding up (slowing down) the playback, which can cause audible pitch and/or tempo variations, embodiments can slow down (speed up) generation of the streaming content at the source device. The source device may or may not provide a command to the playback device to change the size of the playback buffer. Further details for seamless changing a buffer size can be found in concurrently filed U.S. nonprovisional application entitled "Adaptive And Seamless Playback Buffer Adjustment For Streaming Content" by Kumar et al. and U.S. Provisional No. 62/679,656, filed. Jun. 1, 2018, entitled "Adaptive And Seamless Playback Buffer Adjustment For Streaming Content, the disclosures of which are incorporated by reference in their entirety for all purposes.

B. Example Communication Flow

Figure 5:
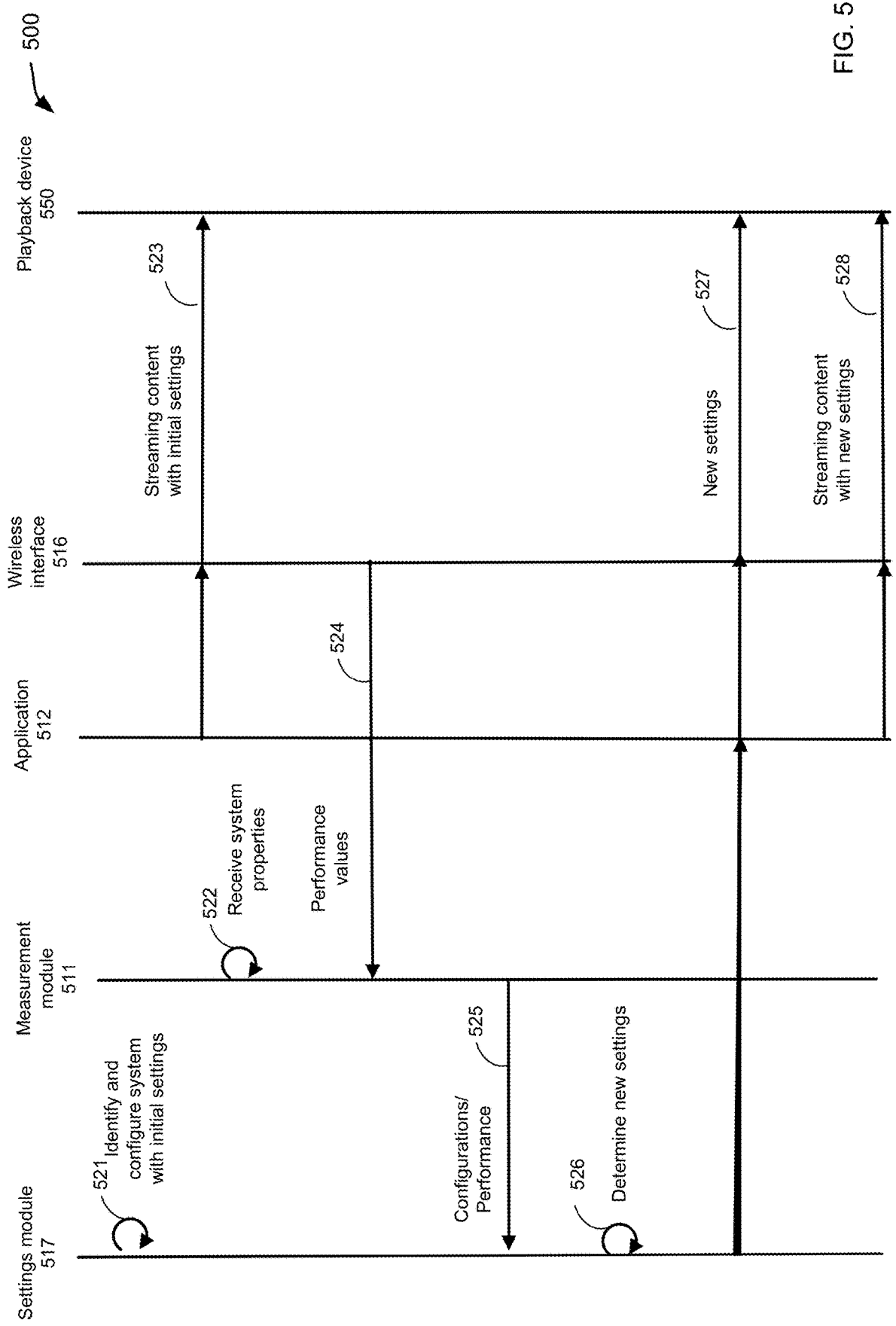
FIG. 5 shows an example sequence diagram for updating settings for a playback session of streaming content from a source device to a playback device according to embodiments of the present disclosure.

FIG. 5 shows an example sequence diagram 500 for updating settings for a playback session of streaming content from a source device to a playback device according to embodiments of the present disclosure. In FIG. 5, an application 512 executing on a source device can provide streaming content to be played at a playback device 550. A settings module 517 of the source device can determine new settings (e.g., a new playback buffer size), as described herein.

At step 521, a settings module 517 identifies initial (first) settings to use in streaming initial content, e.g., a first set of content files. These first settings can be default settings, e.g., when the source device is first used or begins operation with a particular playback device. The playback device may have particular, configurable settings, which may be specified, e.g., in a configuration file. Settings module 517 and/or other modules can configure the system for streaming the content using the first settings.

At step 522, application 512 provides streaming content to playback device 550 using the initial settings. The initial settings can include that the streaming rate is equal to a playback rate. The playback rate can correspond to the rate that playback device 550 is playing (outputting) the streaming content. Thus, if one streaming content file includes more data per second than another streaming content file (e.g., video vs. audio), then the playback rate would be higher. As the streaming content is provided at the playback rate, the amount of data (data level) in a playback buffer would stay roughly the same, e.g., fluctuations occurring around an average buffer size (e.g., a first size).

The content files may be streamed at a plurality of different times. And, the initial settings may have different values for a setting at different times for the same or different content files. For example, different values of a buffer size can be used. Measurements made using the different values of the buffer size can be used to determine an optimal value for the buffer size for one or more system configurations, as may also be done for other settings.

At step 523, a measurement module 511 receives system properties that exist when the content is streamed, e.g., for each playback session. The system properties can include the initial settings. Steps 522 and 523 may be performed in any order or at the same time. The system properties can be received from or relate to various components of the two devices involved in the playback session.

The one or more system properties can be obtained in various ways, e.g., via a pull mechanism (e.g., explicit request) or a push mechanism (e.g., periodically sent from other components or modules). Example system properties include state of the source device (e.g., screen off or on), connection/link properties, states of application 512 (e.g., a streaming rate or a type of content streamed, such as gaming or audio/video), and state of the playback device (e.g., other settings beside buffer size). As to connection properties, the connection can be a wired or wireless connection that can have reliability issues. The connection properties can be received from a network circuit of the source device that provides the connection to the playback device. In some embodiments, settings module 517 can be implemented in such a network circuit.

At step 524, measurement module 511 receives performance values from wireless interface 516. Wireless interface 516 can determine the performance values by monitoring the transmission of data packets to playback device 550 and/or other communications. For example, playback device 550 can provide measurements of a quality of playback. The performance values can relate to noise/interference issues, e.g.; packet loss or purging and fidelity of playback that is achieved, e.g., relating to a sampling rate. Other example performance values are provided herein.

Measurement module 511 can store the performance values for different settings of a given system configuration, such that the performance of different settings can be compared. A system configuration can be defined as any set of non-settable system properties, e.g., a particular application, type of content, connection settings, type of playback device, etc. Thus, the settings can be optimized for a given system configuration (e.g., when source device is in the pocket and music is being streamed to headphones). The settings used for a given system configuration can be stored together, along with the performance values measured for the particular configuration/settings combination, At step 525, the performance values (e.g., as statistics) for various configurations are provided to settings module 517. Settings module 517 can receive current measurements as well as access historical measurements, e.g., to update a model that provides new settings. As an example of other data that settings module can receive, settings module 517 can receive constraints on the system, e.g., that certain performance should not go below a certain value. Such constraints can be implemented as thresholds for determining when settings are to be updated.

At 526, settings module 517 determines at least one new setting, e.g., that playback buffer 554 should have a new buffer size (i.e., a target size). Such a determination can be made using the performance values obtained with various settings, e.g., for system properties that correspond to the current system configuration. Settings module 517 may determine the current system properties to determine the current system configuration, so as to use the performance values measured for that particular configuration. Accordingly, the at least one new setting can be determined based on various factors, such as type of source device, the type of application 512 (e.g., music, video, gaming, etc.), type of playback device, type of streaming content, the one or more system properties, and previous measurements and/or settings (e.g., a table specifying preferred buffer sizes). Such a table can include the optimal settings for the current system properties, which can be fields (columns) of the table, where the optimal settings of a particular row is identified by matching the fields corresponding to the current system configuration. The use of various system properties can be optional, e.g., a settings module 517 may not use the link properties to make a determination for a new buffer size.

At 527, settings module 517 can provide the new settings to any relevant components of the system, e.g., to application 512, wireless interface 516, and/or playback device 550. For example, a new buffer size can be set for playback buffer, e.g., the new size being 250 mns and the old size being 150 ms. In this manner, the playback buffer can expect that the streaming rate will change, and thus not react adversely to this change. Otherwise, the playback device may determine that the connection has severe problems and react to take corrective action. For example, the playback device may be programmed to slow down or speed up the playback based on non-prescribed changes in buffer size, as part of corrective action to maintain the prescribed buffer size. Such a change in playback may only be a few parts per million. But, while such a corrective response may be appropriate for transient changes in the data level of the buffer, such a response would not be appropriate when the size of the buffer is to be changed.

In other embodiments, the playback buffer does not receive such an explicit communication, but instead may infer that a new target size is prescribed based on a sustained change in the streaming rate. In one implementation, a linear change or other significant, sustained change in the data level may be identified as corresponding to a prescribed setting made by the source device.

As another example for providing new settings, instructions can be sent to application 512 instead or as well. For example, settings module 517 can cause information related to a new streaming rate to be provided to application 512. Such information can be provided directly from settings module 517 or indirectly, e.g., through a timing module. For example, settings module 517 can provide an indication that the buffer size is to increase or decrease to a timing module. The timing module can be preconfigured to provide a specified change in data rate (e.g., +/−10%), which can translate into a corresponding change in a clock signal. In other embodiments, settings module 517 can provide a specific amount for the change (e.g., 15% or an absolute data rate) or provide a functional form for how the data rate should change over time. A corresponding clock signal can be determined to change the streaming rate in the specified manner.

At 528, application 512 provides the streaming content with new settings, e.g., at a new streaming rate, a new codec, a new packet size, and the like. A particular component/module may not be aware of a change in setting, while other components may know. For example, application 512 may be unaware that the streaming rate has changed, e.g., when a received clock signal has changed. As far as application 512 would be concerned, it is still providing the streaming content at the prescribed playback rate, e.g., as set by a user. In other embodiments, application 512 may receive the new streaming rate, change an internal setting, and then provide the streaming content at the new rate.

At later steps, settings module 517 can determine that the new buffer size is attained. Such a determination can be performed in various ways. For example, settings module 517 can use a formula: new size old size divided by the change in rate. As another example, settings module 517 can receive information from the playback device about a current data level in playback buffer 554. Settings module 517 can use such periodic measurements to determine when the new buffer size has been attained. As a further example (e.g., when the playback device knows the target size), the playback device can provide a message to the source device that the target size has been attained. Thus, some changes to settings may be temporary so as to effectuate the change of a different setting.

IV. Measurements of Personalization Module

Figure 6:
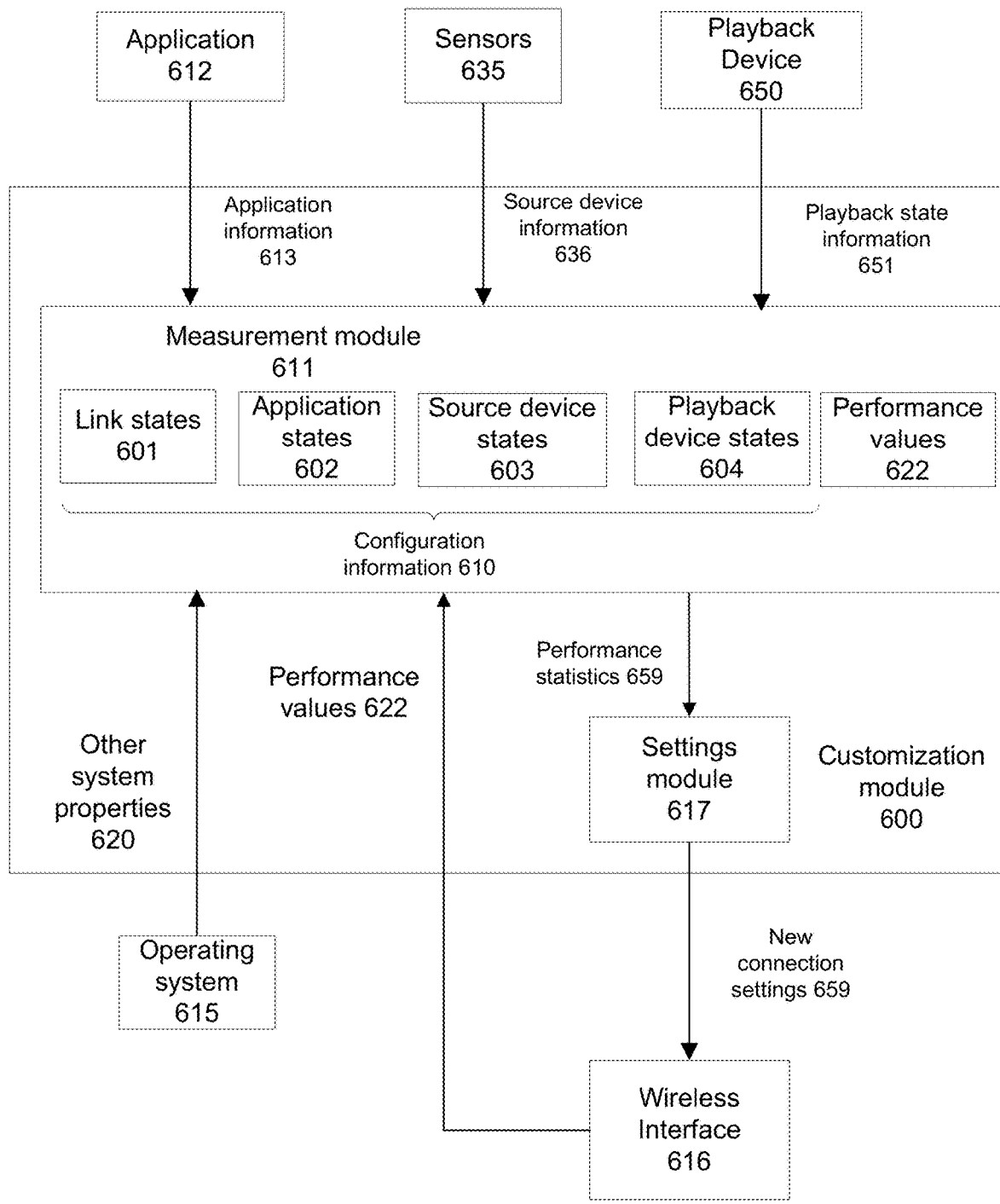
FIG. 6 shows a customization module of a source device for customizing settings for playing content at a playback device according to embodiments of the present disclosure.

FIG. 6 shows a customization module 600 of a source device for customizing settings for playing content at a playback device according to embodiments of the present disclosure. Customization module 600 includes a measurement module 611 (e.g., corresponding to measurement module 411 of FIG. 4 and measurement module 511 of FIG. 5) and a settings module 617 (e.g., corresponding to settings module 417 of FIG. 4 and settings module 517 of FIG. 5).

Measurement module 611 can receive configuration information 610 from various sources to determine a current system configuration being used for streaming content for playback at a playback device 650. Thus, when performance values 622 are received from wireless interface 616, measurement module 611 can store the performance information with the current configuration for later analysis by settings module 617.

As examples, configuration information 610 can include link states 601, application states 602, source device states 603, and playback device states 604. Such information can define a particular system configuration for which particular performance values 622 are obtained. Such information can also include settings that are not part of a system configuration for which settings are being optimized. As an example, measurement module 611 can store a table with each row corresponding to a particular performance value measured at a particular time (i.e., a particular measurement), with fields of the row corresponding to the current configuration information.

Example link states 601 can include various combinations of a codec used, transmission power, and specifications for packetization, e.g., a size of packets. Link information about such link states 601 can be obtained from wireless interface 616. Wireless interface 616 can provide the link information before a playback session occurs or during a playback session.

Example application states 602 includes a streaming rate for providing streaming content, e.g., at a different rate from a playback rate. Application 612 can provide application information 613 regarding application states 602. Application information 613 can also include a type of content that is being provided, e.g., music, video, gaming, etc. As another example, application information 613 can provide preferences for a tradeoff between different performance values, e.g., latency vs. reliability.

Example source device states 603 include a power state, a geographical location, orientation, motion, and proximity to playback device 650. Sensors 635 can provide source device information 636, e.g., GPS location, acceleration, orientation (e.g., vertical or horizontal). Accordingly, sensors 635 can provide information about location, environment, and position (e.g., geographical coordinates, indoor v. outdoor, in pocket vs. on table, etc.).

Other example source device states further include an operating state of the source device, e.g., whether the user is actively using a user interface (e.g., a screen is "on" to a screen is "off"). A proximity of the two devices to each other can be measured, e.g., via round trip timing of specific communications used for such measurements. Another system property could be a location of the source device, e.g., in a pocket. Such a location can be determined using sensor(s) of the source device, e.g., a light sensor can detect ambient light, where a dark measurement can indicate being in a pocket. If the user is not actively using the source device, then higher latency is likely tolerable. Other sensor(s) can also be used, e.g., an accelerometer and a pyrometer, which can be used to determine various motion states of the user, e.g., running, walking, or driving.

Example playback device states 604 include a type of playback device, an audio buffer size, and tradeoff preferences. Playback device 650 can provide playback state information 651. Operating system 615 of the source device can provide other system properties 620, as well, e.g., whether other components are powered on, e.g., a screen, a camera, a light, and other context information.

Measurement module 611 can provide performance statistics 659 to settings module 617 for determining any changes to the settings. In various implementations, measurement module 611 can provide the raw data to setting module 617 or perform some initial analysis, so as to provide statistical information.

Example statistics can include jitter buffer depth being used, e.g., for audio. For instance, current buffer size 458 of FIG. 4 can be measured by the source device or by the playback device. In one implementation, the jitter buffer depth can be calculated as the time difference between sending a packet to a communication controller (e.g., a Bluetooth or WiFi chip) and receiving the corresponding completed packet event. Other example statistics from a network circuit or communication controller include: retransmission rate, packet loss rate, transmission, retransmission, and loss patterns (e.g., if any packets get purged and cannot sent on time for the headset), noise floor from the one or more radios (e.g., relating to the interface protocol being used for playback or for others being used), a level of noise of the environment (e.g., fluctuations in the measured EM signal), other communications controllers being used (e.g., WiFi, LTE, and other radio usage and channels) and how much that are used, and number and pattern of lost/purged packets from the operating system stack and/or the communication controller. The playback device can provide similar statistics (e.g. never-received packet rate, RSSI, etc.).

Given that performance statistics are measured for different system configurations, an optimal setting for a given system configuration can be determined using the measurements made while the system is in that configuration. Accordingly, every time a user puts the source device in a pocket (or other configuration), the source device can use the optimal settings for that configuration. But, if the user put the source device in a different configuration (e.g., on a table, as may be determined using an pyrometer (horizontal orientation) and an accelerometer (no movement)), then different optimal settings can be used.

If one or more of the system properties change, such a change can be identified as an event that requires re-evaluation of one or more settings. The new system properties (i.e., after a change) can indicate that a new setting is to be used. Besides being dependent on a new system property, such a change can depend on what the other system properties are (i.e., the ones that have not changed). For example, the new setting can depend on whether the application is for gaming or music, even though the type of application did not change. For the same connection (link) properties, a gaming application would tend to have a smaller jitter buffer than a music application. Thus, if the connection degraded, the buffer size may increase, but the target size can be different depending on the type of application.

Example factors that indicate a re-evaluation is needed (e.g., triggers to update settings) can include screen on/off status, user interaction (e.g. with physical or touchscreen buttons), whether the application is running in the foreground, use of an accessibility mode for users that are visually impaired, audio block size chosen by an application as a proxy for latency requirements, audio mode chosen by an application, or other specific system APIs for applications to directly communicate their intent and/or requirements regarding playback latency. For example, if a user is running and listening to music with the screen off, low latency is likely not required, and the settings can be selected accordingly.

The specific state of the source device does not need to be known (e.g., in a packet), as long as the sensor measurements are essentially the same so as to define a configuration. The performance statistics for the sensor measurements of a configuration can be required to be sufficiently similar for new measurements to be considered part of a same configuration.

V. Tuning Parameters and Tradeoffs

The settings (parameters) can be tuned using the performance measurements at various settings for a given system configuration. Further, acceptable ranges of the performance values can indicate when one or more settings should be updated. Preferences about which performance values are more important (referred to as tradeoff preference) can also be used to determine the optimal settings for a given configuration.

A. Settings Module

Figure 7:
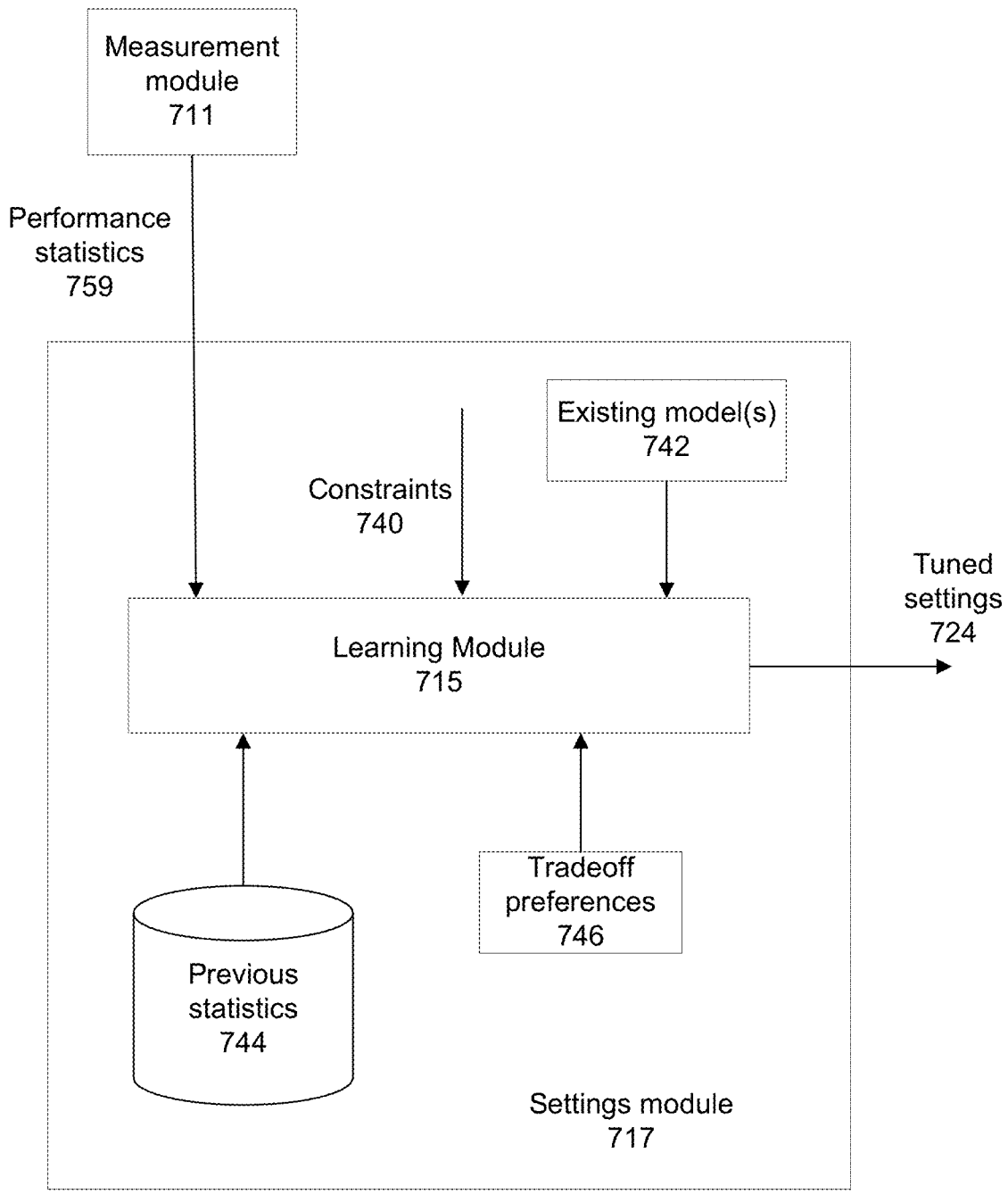
FIG. 7 illustrates a settings module that learns knew optimal settings for a playback session based on performance statistics of previous playback sessions according to embodiments of the present disclosure.

FIG. 7 illustrates a settings module that learns knew optimal settings for a playback session based on performance statistics of previous playback sessions according to embodiments of the present disclosure. Settings module 717 includes a learning module 715. Measurement module 711 can provide performance statistics 759 to learning module 715. Learning module 715 can use these performance statistics to determine tuned settings 724 for playing subsequent content. Tuned settings 724 can be provided to any component for which a setting may be updated. Learning module 715 can be executed at various times. For example, learning module can be run periodically at night, e.g., every day or once a week, or whenever charging.

Besides performance statistics 759, learning module 715 can receive other information. For example, performance statistics 759 can correspond to recent measurements and provide a relatively fine resolution for the measurements, and previous statistics 744 can correspond to older measurements. The previous measurements may be stored at a coarser resolution than the recent measurements. For example, the previous measurements may only be statistical in nature and correspond to larger time intervals, so that there is less data to be stored. Further, the previous statistics can be stored as one or more representative values, e.g., relating to a moving average or other filer, such as a Kalman filter.

Constraints 740 can specify certain requirements, e.g., a maximal latency that is acceptable. Tradeoff preferences 746 can specify a weighting between different performance statistics, thereby providing a preference for operation of the system. For example, a lower latency can be preferred to higher reliability. The weightings can specify the extent of the preference, so that a change to a setting does not improve one performance value without regard of another performance values. Some examples of the tuning parameters (settings) and tradeoffs are provided below.

A buffer size (e.g., an audio jitter buffer) can help define latency vs. reliability. For example, a larger jitter buffer can reduce glitches but increases latency. Particular codecs and intervals can include HFP or AAC-ELD. For example, for HFP, shorter duration mSBC packets (vs_ longer AAC-ELD packets) can reduce glitches but negatively affect fidelity. An interval relates to how often data is sent. For instance, the source device can send 30 milliseconds of audio every 30 milliseconds or 60 milliseconds of audio every 60 milliseconds. Bigger chunks are more efficient, but they are more prone to more error or less resilience to packet loss, e.g., 60 milliseconds of loss instead of only 30 milliseconds.

Regarding transmission power, using more power and/or increasing power more aggressively can reduce glitches but also reduce battery life and increases interference. Power tuning can relate to a different balance between wireless protocols, e.g., Bluetooth versus LTE power. Regarding over the air packetization, slower/smaller packets are more reliable but reduce airtime for other wireless activity, e.g., BT/WiFi), A coprocessor (e.g., audio of video processor) can use a particular sampling bit rate for the content that is sent to the playback device. A streaming rate per unit time can be configurable, e.g., by providing commands to the application.

Certain settings can be changed in combination. For example, an audio sampling rate can be changed in combination with a playback buffer size. Initially, a bit rate of 320 kilobytes may be used with the performance values outside a desired range of glitches (e.g., according to constraints 740 and tradeoff preferences 746). In response, settings module 717 can decrease the bit rate, resulting in more playback content being stored in the playback buffer. But, in order to not decrease the sound fidelity too much, settings module 717 can also increase the overall buffer size. Conversely, if glitches are sufficiently low, the date rate could increase (increasing fidelity) and/or a buffer size can decrease (reducing latency).

Such monitoring of performance statistics can adapt to changing properties of a source device and/or a playback device. For example, water could be spilled on headphones, which may cause a deterioration in their operation. As a result, the performance statistics will degrade. The settings module can identify the degradation (e.g., a particular performance value may exceed a threshold) and change a setting to cause the performance value (e.g., latency) to improve. Depending on the change in the performance value, further changes can be made to the setting (e.g., incremental changes) if initial improvement is not sufficient.

As another example of an adaptive process, measurements of the amount of data (data level) in the playback buffer can be used to update settings (e.g., a buffer size). If the data level varies from near zero (e.g., 20 ms of data) to the specified buffer size (e.g., 150 ms), it can be determined to increase the buffer size as there is an increase probability of glitches. Or, if the data level is consistently at the specified buffer size, it can be determined that the buffer size can be decreased, since the amount of variation is relatively minimal, and thus there is a low probability of glitches occurring even at a reduced buffer size, which can result in reduced latency.

B. Example Models

Various models/logic can be used by settings module 717 to determine when to change a setting and what the new setting should be. For example, a table can include various fields (e.g., categorical or numerical), where the current system properties can match to a particular row that has specified value(s) for one or more settings. Thus, a given configuration of N properties can specify particular setting(s) to use. Such a table can be updated periodically using a combination of recent performance values and previous statistics, e.g., with a weighting specifying importance in optimizing the recent performance values vs. optimizing the previous statistics. The weighting may be static or dynamic, e.g., as may be done with a Kalman filter.

Other mechanisms can be used besides a table. For example, machine learning model can specify the relationship between the performance values and the settings (and other system properties) to determine the optimal settings for a given configuration. The settings of a given configuration (including device states, application states, and other states) can be considered the input features, and the measured performance values can be used as the output labels. A training sample can include the values of a given configuration (set of input features) and the one or more measured performance values (output label(s)) of the given configuration.

A machine learning model can be trained using training samples to predict the performance value(s) for a given configuration, so as to determine the optimal settings. For example, the source device can use a regression model to determine the effect of different settings on the performance values. For example, the impact of retransmission rate on glitches or impact of RSSI on retransmission rates can be determined. In another embodiment, a deep learning model may take all or a fraction of inputs and output one or multiple desired parameters.

In various embodiments, a single machine learning model can be used for all configurations or multiple machine learning models can be used, e.g., for certain states of a given configuration. For instance, a machine learning model can be determined using the training samples for a particular playback device when the source device is in a particular location, while other system properties can vary. Using only training samples specific to certain system properties can allow for a more accurate model to be trained. A cheap set of headphones can have very different properties than expensive headphones.

Various machine learning models can be used. For example, a decision tree can use the current values for the factors to ultimately select the setting(s) at the end of the tree. Other machine learning models besides a decision tree can be used, e.g., a neural network or linear regression. Any of the setting(s) could can change discretely or continuously for given changes in the conditions (properties)

In some embodiments, existing model(s) 742 may be used. For example, a model may be established for one playback device or one source device. When that device is upgraded, the settings model for that device can be used as an initial settings model for a corresponding system configuration. Such a model will likely be updated based on performance measurements for the new device, but the existing relationship between system properties and performance may be similar enough (e.g., as a result of the same user's body being the same and causing a same amount of interference). In other examples, existing model(s) 742 can include models pre-tuned for different types of users or types of configurations. A suitable model can be selected from this set of models, or used as a starting point for further customization.

The training set can expand as more settings are tried in an effort to obtain improved performance. The changes in the space of different settings could be made proactively, but would typically be in response to performance values being outside of a threshold, e.g., skip every hour. The corrective action may be prescribed, e.g., a skip causes a change in a buffer size. If changing the buffer size does not cause the number of glitches to be within an acceptable range, other settings can be changed. Such changes of settings can provide a better training set, and thus a better model tailored for the particular source/playback device of a user.

VI. Flowchart

Figure 8:
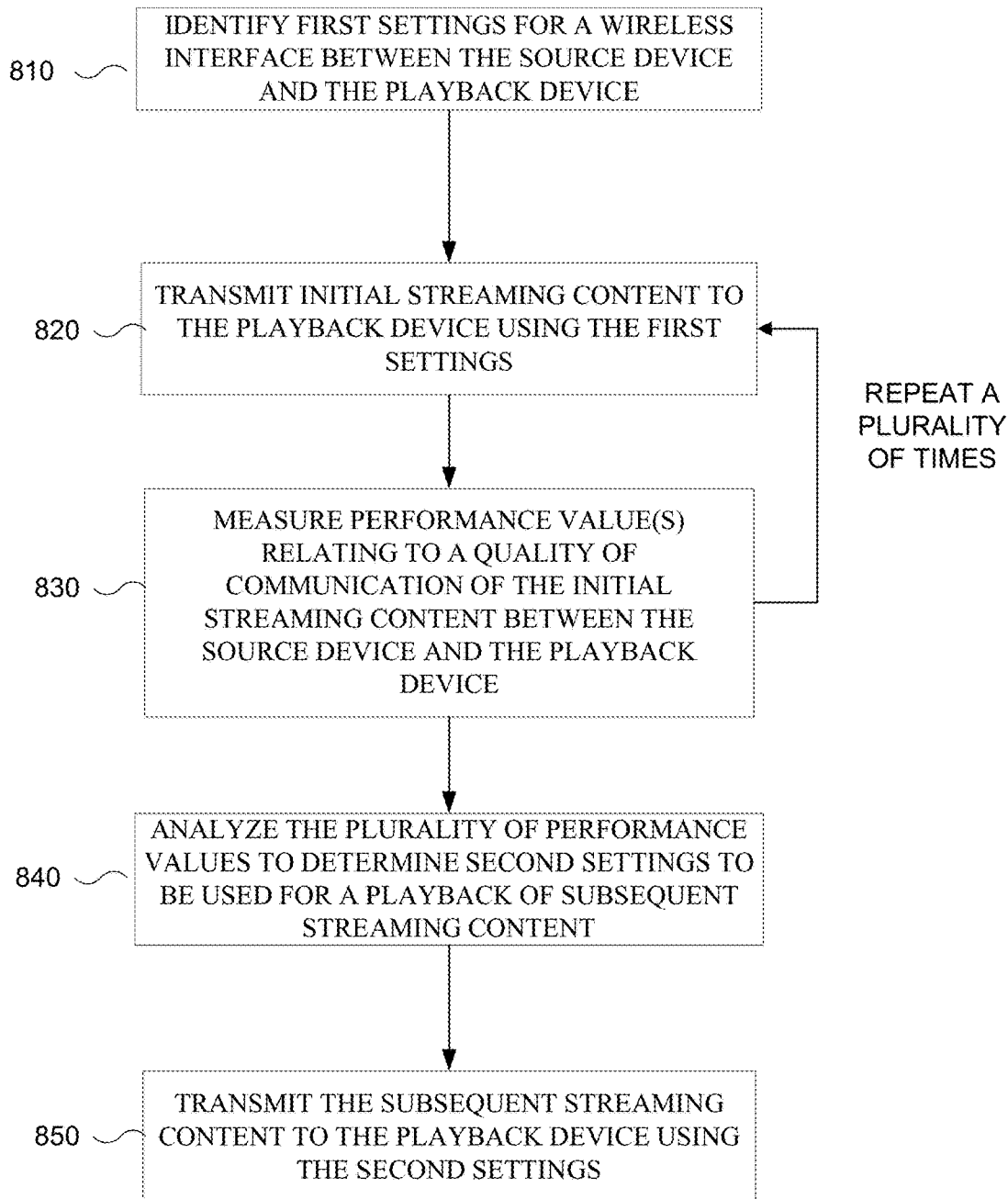
FIG. 8 is a flowchart illustrating a method of using a source device for facilitating playback of streaming content at a playback device that is in wireless communication with the source device.

FIG. 8 is a flowchart illustrating a method 800 of using a source device for facilitating playback of streaming content at a playback device that is in wireless communication with the source device. The playback device may be in wireless communication with the source device. Method 800 can be performed by the source device, source device 410. The source device may be a portable device.

At block 810, first settings are identified for a wireless interface between the source device and the playback device. As examples, the first settings may be default settings for the source device and/or the playback device, or the first settings may be the result of previous customization to a user. For example, the initial settings may be settings 115 of FIG. 1. In some embodiments, a certain portion of the initial settings may be updated, while other settings may not be capable of being updated, e.g., for a particular system configuration.

Blocks 820 and 830 may be repeated a plurality of times as part of a plurality of playback sessions. Each playback session can include one or more different system properties, and thus relate to different system configurations. Different playback sessions can also have different values for the first settings. Using the different values can help understand the relationship between the settings and performance, thereby allowing optimal settings to be determined.

At block 820, initial streaming content is transmitted over the wireless interface to the playback device using the first settings for a playback session. The initial streaming content can correspond to different applications (e.g., for gaming, audio, video, haptic, etc.) and to different content files (e.g., different music and movies). Accordingly, a plurality of different streaming content files can be transmitted over the plurality of times as part of playing the initial streaming content. The playback sessions for the initial streaming content can be implemented using various values for the first settings. In this manner, the different values for the settings can be explored to determine the optimal settings.

At block 830, one or more performance values of the playback session are measured relating to a quality of communication of the initial streaming content between the source device and the playback device over the wireless interface. Since the one or more performance values are measured at a plurality of times, a plurality of performance values are obtained across the plurality of times. The performance value may be measured by a measurement module, as described herein.

The performance values may correspond to various properties of the playback session. For example, the plurality of performance values can include at least one selected from a data level used in a jitter buffer, a retransmission rate, a noise floor, and number of data packets lost or purged. These performance values relate to link properties that can be improved by updating the settings. Other measurements can relate to link states, which relate to current conditions as opposed to link properties that can be improved.

At block 840, the plurality of performance values are analyzed to determine second settings to be used for a playback of subsequent streaming content between the source device and the playback device. In some embodiments, a settings module can determine the performance values are outside of a desirable range. For example, the analysis can determine that a first performance value exceeds a specified threshold. Logic of the settings module or a store association file can identify a particular setting as affecting the first performance value, e.g., a buffer size can be identified as affecting a number of glitches. Once identified, a value of the particular setting can be changed, e.g., according to a tradeoff preference stored at the source device. Such a tradeoff preference can specify an extent to change the value of the particular setting based on a negative impact on a second performance value.

The second settings can include at least one setting having an optimal value relative to the first settings according to the plurality of performance values. For example, two different values could be used for a packet size, and the optimal one of the two size could be selected for the second settings. The optimization can be determined by selecting the combination of setting values that provide an optimal tradeoff between performance values, e.g., as specified by a cost function defined using weightings of tradeoff preference e.g., as preferred by an application, user, device etc.).

When the second settings are new setting, the second settings can include at least one setting having a different value than the first settings. For instance, the second settings can include one new setting for a jitter buffer of the playback device and another new setting for a rate that an application provides the subsequent streaming content. In some embodiments, the second settings can be determined while transmitting a first portion of the subsequent streaming content using the first settings, and wherein a second portion of the subsequent streaming content is transmitted using the second settings. Thus, different settings can be used for different portions of a playback session.

At block 850, the subsequent streaming content is transmitted over the wireless interface to the playback device using the second settings. As examples, the second setting can include at least one new setting for a codec for the subsequent streaming content, a transmission power to be used when transmitting the subsequent streaming content, and a size of data packets used to transmit the subsequent streaming content.

When the settings are tuned (optimized) for a particular system configuration, one or more system properties can be determined of the source device, of the playback device, the link between the devices, or any combination thereof. These system properties can be determined at each of the plurality of times, and different system configurations can exist at the different times. A system configuration can be determined for each of the one or more performance values, e.g., each measured during a corresponding playback session. Each of the plurality of performance values can be stored in association a corresponding system configuration, e.g., as described in FIG. 6. These performance values with the system configurations can be used in the analysis. For example, a current system configuration can be determined. And, the second settings can be determined using the performance values measured with the first system configuration that matches the current system configuration.

In some embodiments, a model can maps settings to performance values, e.g., a regression model. The model can be generated using the performance values measured with the first system configuration that matches the current system configuration. The optimal settings that provide optimal performance values according to the model can be selected. For example, a maximum in the regression model can be identified, and the corresponding settings at that point can be used.

In various embodiments, the current system configuration can include a location of the source device and/or an angular orientation of the source device. In various implementations, properties of a system configuration includes a type of the playback device such that different performance values are stored for different types of playback devices, thereby allowing optimal values for the different playback devices.

VII. Example Device

Figure 9:
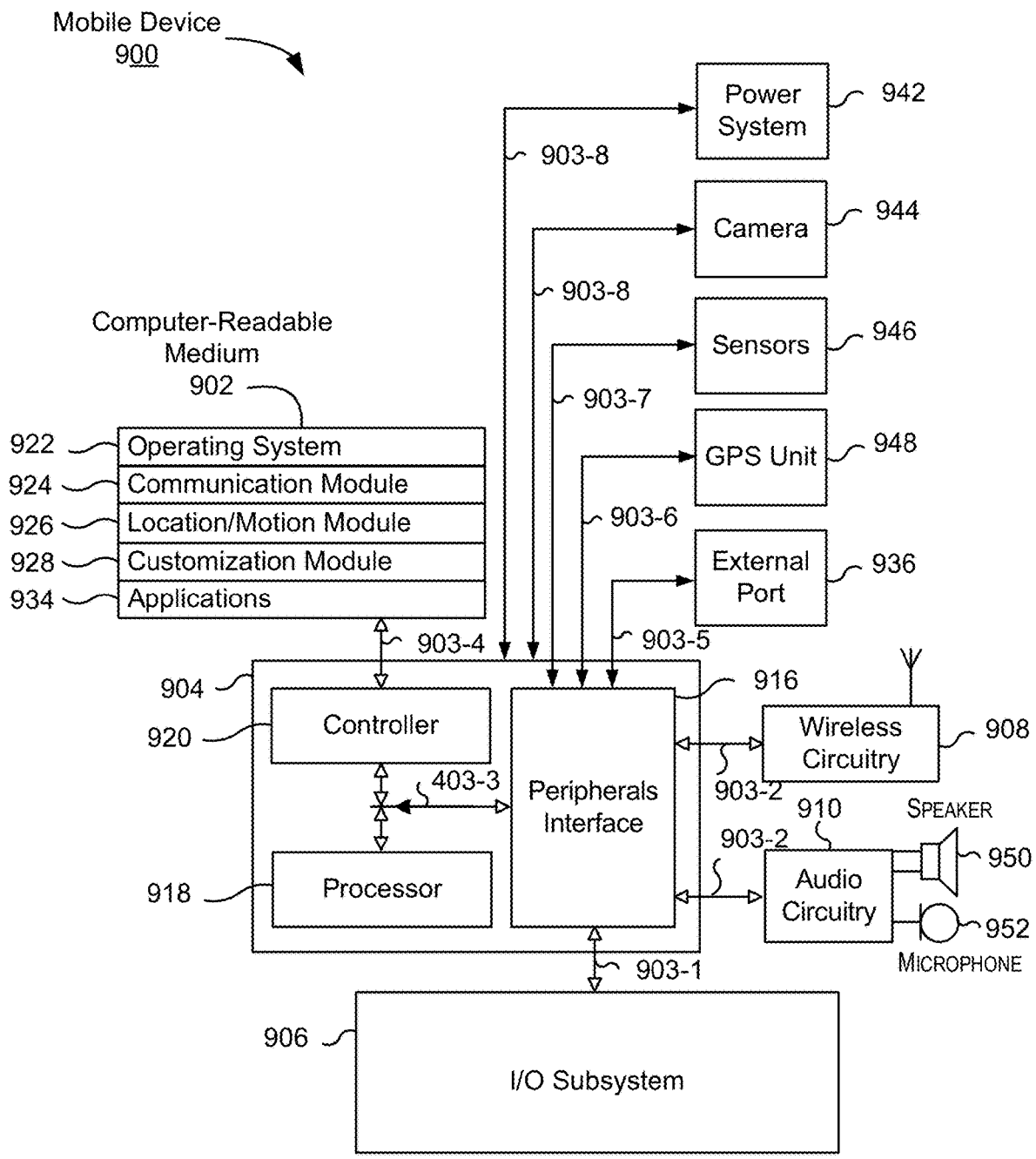
FIG. 9 is a block diagram of an example electronic device.

FIG. 9 is a block diagram of an example electronic device 900. Device 900 generally includes computer-readable medium 902, a processing system 904, an Input/Output (I/O) subsystem 906, wireless circuitry 908, and audio circuitry 910 including speaker 912 and microphone 914. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a headset, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11 a, IEEE 802.11b, WEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 916, one or more processors 918, and controller 920 can be implemented on a single chip, such as processing system 904. In some other embodiments, they can be implemented on separate chips.

Processor(s) 918 can include hardware and/or software elements that perform one or more processing functions, such as mathematical operations, logical operations, data manipulation operations, data transfer operations, controlling the reception of user input, controlling output of information to users, or the like. Processor(s) 918 can be embodied as one or more hardware processors, microprocessors, microcontrollers, field programmable gate arrays (FPGAs), application-specified integrated circuits (ASICs), or the like.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module 924 (or set of instructions), a location module 926 (or set of instructions), a customization module 928 that is used as part of determining settings (e.g., a playback buffer size) described herein, and other application programs 934 (or set of instructions).

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.

Location/motion module 926 can assist in determining the current position (e.g., coordinates or other geographic location identifiers) and motion of device 1300. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter Ms. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data A customization module 928 can determine settings of mobile device 900 and/or of other devices (e.g., a playback device) in communication with device 900. For example, customization module 928 can include a measurement module and a settings module, as described herein. As an example, customization module 928 can determine a buffer size of a playback (jitter) buffer of a playback device. Customization module 928 can make the determination based on information obtained from other components of device 900, e.g., from wireless circuitry 908, which may correspond to a wireless interface. Customization module 928 can communicate with various application programs 934, e.g., ones that provide streaming content. For example, Customization module 928 can cause a change in a rate that streamlining content is provide from an application. In some embodiments, customization module 928 can also include a timing module or cause a timing module to provide a sped up or slowed down clock signal to a streaming application.

The one or more applications 934 on device 900 can include any applications installed on the device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments; the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Pert or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve the playback of streaming content. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine improved settings for the playback of streaming content. Accordingly, use of such personal information data enables user devices to determine such improved settings. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of customized per-user device environment parameter tuning, the present technology can be configured to allow users to select to "opt in" or "opt out" of participation in the collection of personal information data during registration for services or anytime thereafter. In another example, users can select not to provide performance values or other data for tuning playback settings. In yet another example, users can select to limit the length of measuring performance values or providing of other data is maintained or entirely prohibit the development of a model for determining playback settings. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a cite level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, settings can be selected by inferring preferences based on non-personal information data or a bare minimum amount of personal information, such as the content being requested by the device associated with a user, other non-personal information available to the content playback services, or publicly available information.

Although the present disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method of using a source device for facilitating playback of streaming content at a playback device that is in wireless communication with the source device; the method comprising, at the source device:
    identifying first settings for a wireless interface between the source device and the playback device, the source device being a portable device;
    at each of a plurality of times:
        transmitting, over the wireless interface, initial streaming content to the playback device using the first settings for a playback session;
        measuring one or more performance values of the playback session relating to a quality of communication of the initial streaming content between the source device and the playback device over the wireless interface, thereby obtaining a plurality of performance values across the plurality of times;
    analyzing the plurality of performance values to determine second settings to be used for a playback of subsequent streaming content between the source device and the playback device, the second settings including at least one setting having an improved value relative to the first settings according to the plurality of performance values; and
    transmitting, over the wireless interface, the subsequent streaming content to the playback device using the second settings.

2. The method of claim 1, wherein the second settings include a new setting for a jitter buffer of the playback device and another new setting for a rate that an application provides the subsequent streaming content.

3. The method of claim 1, wherein analyzing the plurality of performance values includes:
    determining that a first performance value exceeds a specified threshold;
    identifying a particular setting as affecting the first performance value; and
    changing a value of the particular setting according to a tradeoff preference stored at the source device, the tradeoff preference specifying an extent to change the value of the particular setting based on a negative impact on a second performance value.

4. The method of claim 1, further comprising:
    at each of the plurality of times, determining a first system configuration for each of the one or more performance values; and storing each of the plurality of performance values in association with a corresponding system configuration,
wherein analyzing the plurality of performance values to determine second settings includes:
    determining a current system configuration; and
    determining the second settings using the performance values measured with the first system configuration that matches the current system configuration.

5. The method of claim 4, wherein determining the second settings includes:
    using a model that maps settings to performance values, the model generated using the performance values measured with the first system configuration that matches the current system configuration; and
    selecting improved settings that provide improved performance values according to the model.

6. The method of claim 4, wherein the current system configuration includes at least one of: a location of the source device and an angular orientation of the source device.

7. The method of claim 4, wherein properties of a system configuration includes a type of the playback device such that different performance values are stored for different types of playback devices.

8. The method of claim 1, wherein the second settings are determined while transmitting a first portion of the subsequent streaming content using the first settings, and wherein a second portion of the subsequent streaming content is transmitted using the second settings.

9. The method of claim 1, wherein a plurality of different streaming content files are transmitted over the plurality of times as part of playing the initial streaming content, and wherein playback sessions for the initial streaming content are implemented using various values for the first settings.

10. The method of claim 1, wherein the plurality of performance values include at least one selected from a data level used in a jitter buffer, a retransmission rate, a noise floor, and number of data packets lost or purged.

11. The method of claim 1, wherein the second settings include at least one new setting for a codec for the subsequent streaming content, a transmission power to be used when transmitting the subsequent streaming content, or a size of data packets used to transmit the subsequent streaming content.

12. A computer product comprising a non-transitory computer-readable medium storing instructions that when executed control a source device to facilitate playback of streaming content at a playback device that is in wireless communication with the source device, the instructions causing the source device to perform:
    identifying first settings for a wireless interface between the source device and the playback device, the source device being a portable device;
    at each of a plurality of times:
        transmitting, over the wireless interface, initial streaming content to the playback device using the first settings for a playback session;
        measuring one or more performance values of the playback session relating to a quality of communication of the initial streaming content between the source device and the playback device over the wireless interface, thereby obtaining a plurality of performance values across the plurality of times;
    analyzing the plurality of performance values to determine second settings to be used for a playback of subsequent streaming content between the source device and the playback device, the second settings including at least one setting having an improved value relative to the first settings according to the plurality of performance values; and
    transmitting, over the wireless interface, the subsequent streaming content to the playback device using the second settings.

13. The computer product of claim 12, wherein the second settings include a new setting for a jitter buffer of the playback device and another new setting for a rate that an application provides the subsequent streaming content.

14. The computer product of claim 12, wherein analyzing the plurality of performance values includes:
    determining that a first performance value exceeds a specified threshold;
    identifying a particular setting as affecting the first performance value; and
    changing a value of the particular setting according to a tradeoff preference stored at the source device, the tradeoff preference specifying an extent to change the value of the particular setting based on a negative impact on a second performance value.

15. The computer product of claim 12, wherein the instructions further cause the source device to perform:
    at each of the plurality of times, determining a first system configuration for each of the one or more performance values; and
    storing each of the plurality of performance values in association with a corresponding system configuration,
    wherein analyzing the plurality of performance values to determine second settings includes:
        determining a current system configuration; and
        determining the second settings using the performance values measured with the first system configuration that matches the current system configuration.

16. The computer product of claim 12, wherein the plurality of performance values include at least one selected from a data level used in a jitter buffer, a retransmission rate, a noise floor, and number of data packets lost or purged.

17. A source device for facilitating playback of streaming content at a playback device that is in wireless communication with the source device, the source device comprising one or more processors configured to:
    identify first settings for a wireless interface between the source device and the playback device, the source device being a portable device;
    at each of a plurality of times:
        transmit, over the wireless interface, initial streaming content to the playback device using the first settings for a playback session;
        measure one or more performance values of the playback session relating to a quality of communication of the initial streaming content between the source device and the playback device over the wireless interface, thereby obtaining a plurality of performance values across the plurality of times;
    analyze the plurality of performance values to determine second settings to be used for a playback of subsequent streaming content between the source device and the playback device, the second settings including at least one setting having an improved value relative to the first settings according to the plurality of performance values; and
    transmit, over the wireless interface, the subsequent streaming content to the playback device using the second settings.

18. The source device of claim 17, wherein the second settings include a new setting for a jitter buffer of the playback device and another new setting for a rate that an application provides the subsequent streaming content.

19. The source device of claim 17, wherein analyzing the plurality of performance values includes:
- determining that a first performance value exceeds a specified threshold;
- identifying a particular setting as affecting the first performance value; and
- changing a value of the particular setting according to a tradeoff preference stored at the source device, the tradeoff preference specifying an extent to change the value of the particular setting based on a negative impact on a second performance value.

20. The source device of claim 17, wherein the one or more processors are further configured to:
- at each of the plurality of times, determine a first system configuration for each of the one or more performance values; and
- store each of the plurality of performance values in association with a corresponding system configuration,
- wherein analyzing the plurality of performance values to determine second settings includes:
  - determining a current system configuration; and
  - determining the second settings using the performance values measured with the first system configuration that matches the current system configuration.

* * * * *